(12) United States Patent
Richard

(10) Patent No.: US 6,474,245 B2
(45) Date of Patent: Nov. 5, 2002

(54) STORAGE AND TRANSPORT SUPPORT FOR AIRPLANE SEAT

(76) Inventor: Arthur Richard, 2080 Donat, Longueuil, Quebec (CA), J4M 2V7

(*) Notice: Subject to any disclaimer, the term of this patent is extended or adjusted under 35 U.S.C. 154(b) by 23 days.

(21) Appl. No.: 09/769,406

(22) Filed: Jan. 26, 2001

(65) Prior Publication Data

US 2002/0100396 A1 Aug. 1, 2002

(51) Int. Cl.$^7$ ................................................ B65D 19/38
(52) U.S. Cl. ..................................... 108/54.1; 108/55.1
(58) Field of Search ............................... 108/55.1, 55.3, 108/55.5, 54.1, 28; 248/346.02, 346.06, 346.07, 346.01; 206/386, 599, 600

(56) References Cited

U.S. PATENT DOCUMENTS

| | | | |
|---|---|---|---|
| 2,633,982 A | * | 4/1953 | Addison |
| 2,828,931 A | * | 4/1958 | Harvey |
| 3,315,800 A | * | 4/1967 | Wagner |
| 5,092,541 A | * | 3/1992 | Tofflemire et al. |
| 5,101,964 A | | 4/1992 | Westphal |
| 5,433,320 A | | 7/1995 | Daouk |
| 5,497,708 A | | 3/1996 | Jeruzal |
| 5,529,185 A | | 6/1996 | Alspach et al. |
| 5,553,813 A | | 9/1996 | Merensky |
| 5,575,389 A | | 11/1996 | Alspach et al. |
| 5,626,231 A | * | 5/1997 | Kwong et al. |
| 5,688,096 A | * | 11/1997 | Gagnon et al. |
| 5,842,424 A | * | 12/1998 | Prevot et al. |
| 5,894,803 A | | 4/1999 | Kuga |
| 5,970,885 A | | 10/1999 | Polando |
| 6,006,676 A | * | 12/1999 | Creck et al. |
| 6,231,284 B1 | * | 5/2001 | Kordel |

FOREIGN PATENT DOCUMENTS

CA 701521 * 1/1965

* cited by examiner

Primary Examiner—Jose V. Chen
(74) Attorney, Agent, or Firm—Ogilvy Renault; Michel Sofia

(57) ABSTRACT

A system for transporting and storing a variety of airplane seats comprises a portable base pallet and a pair of adjustable seat supports for securely mounting a seat on the base pallet. The base pallet is adapted to either fit into a secondary tray installed in a pallet rack or into a complememtary support structure provided on a mobile cart, thereby respectively allowing the seat to be stored or repaired without having to be removed from the pallet.

10 Claims, 3 Drawing Sheets

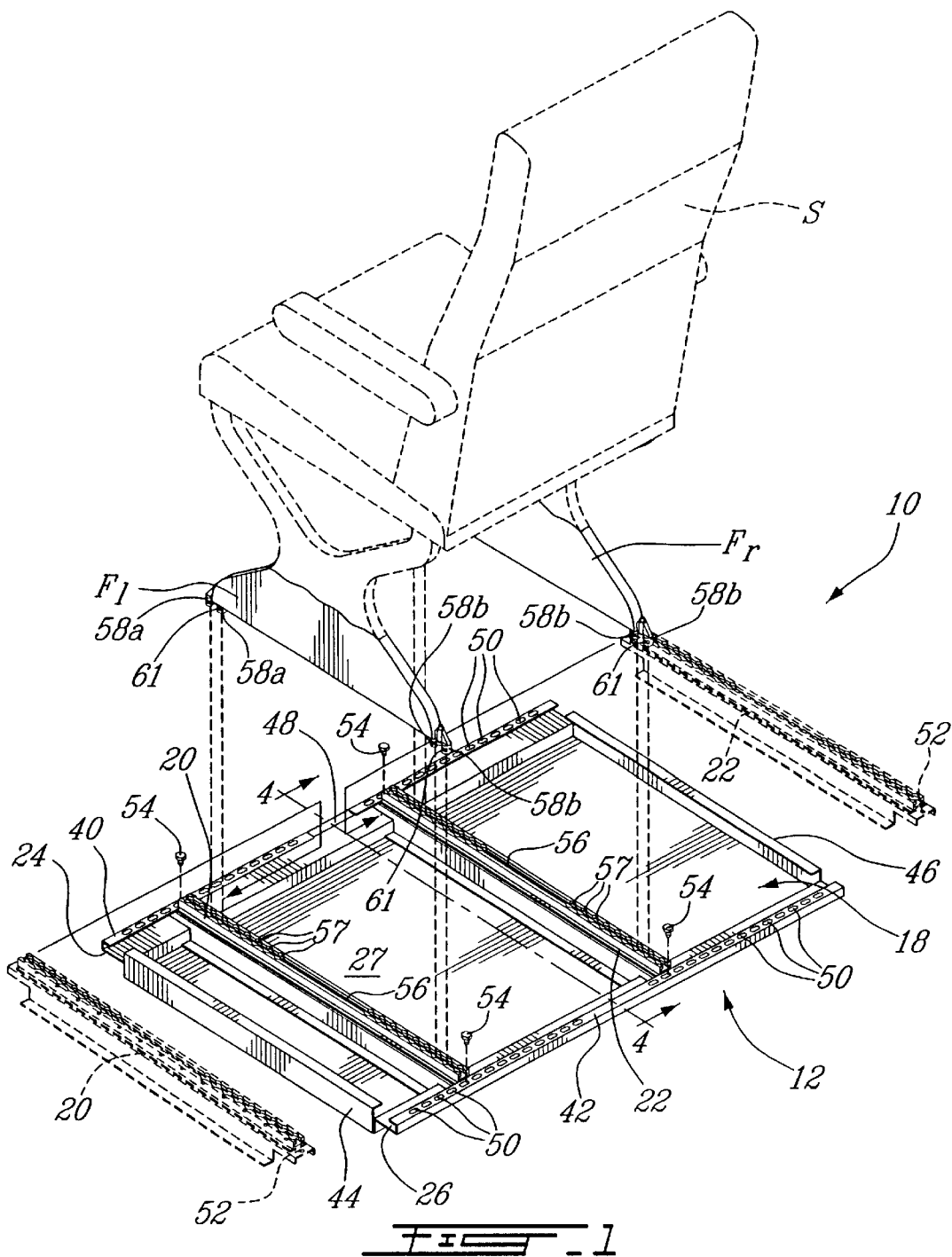

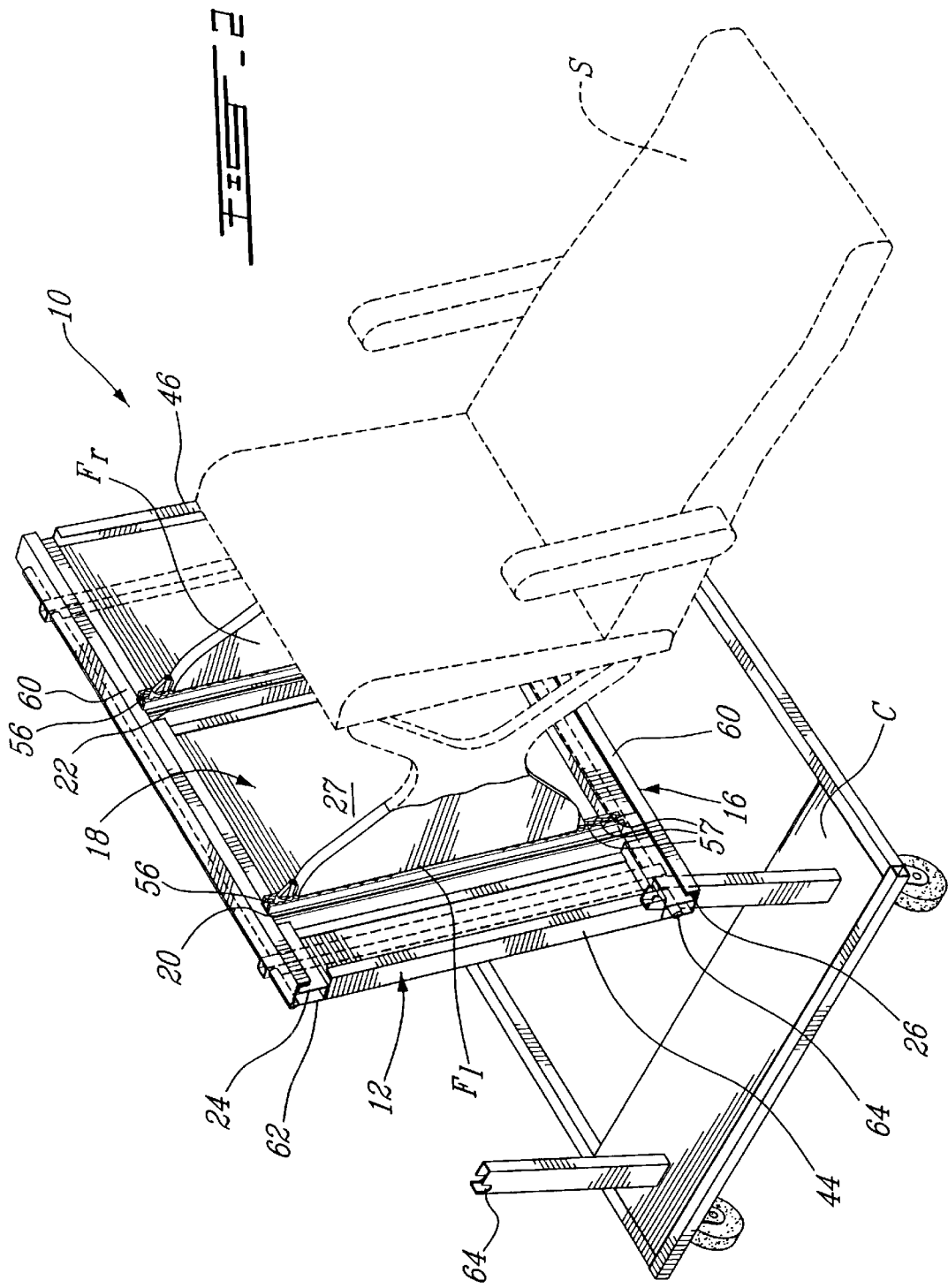

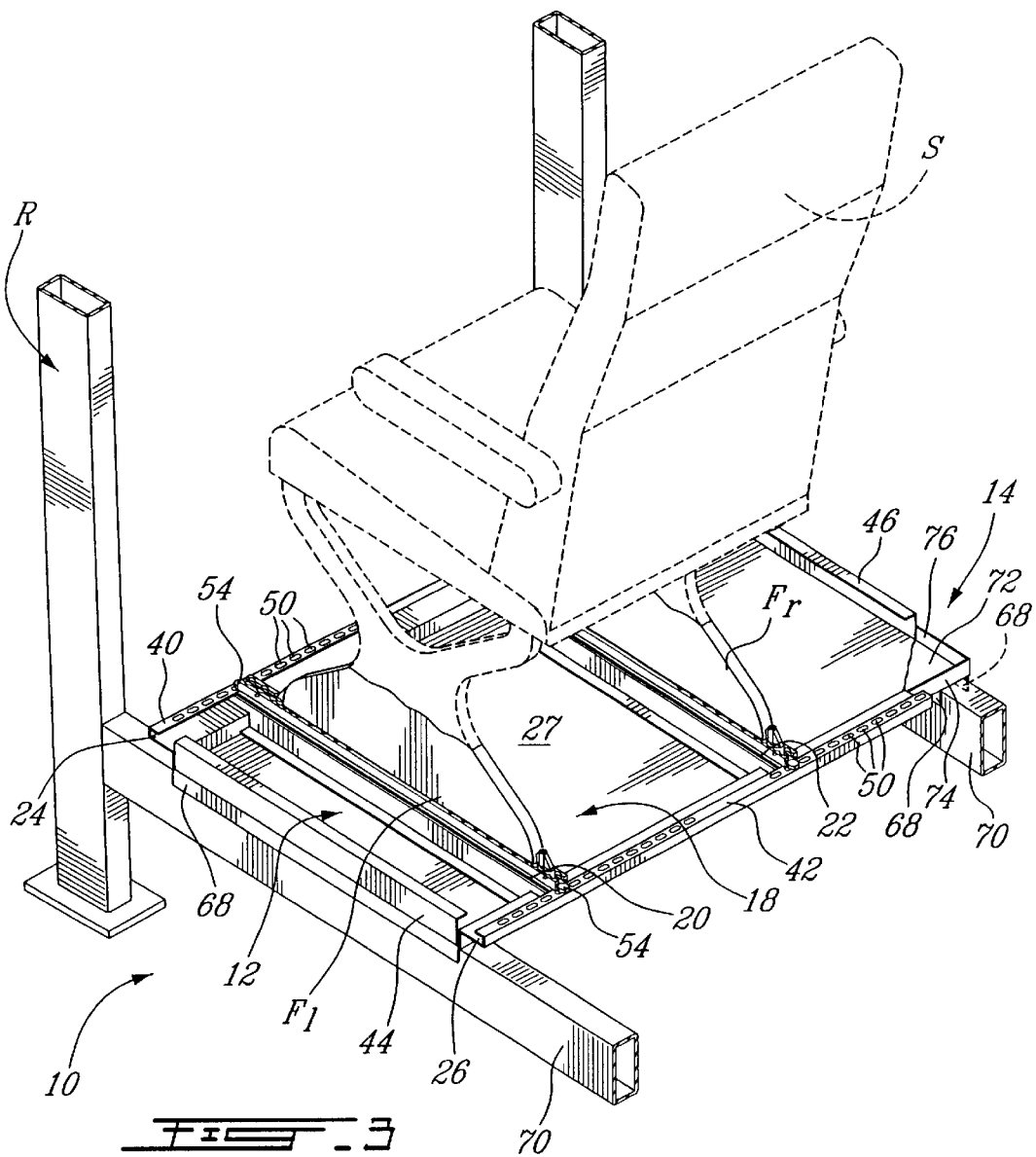
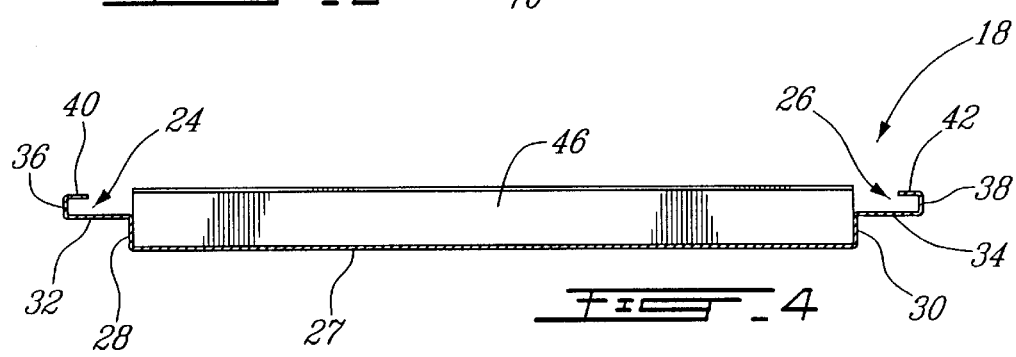

STORAGE AND TRANSPORT SUPPORT FOR AIRPLANE SEAT

BACKGROUND OF THE INVENTION

1. Field of the Invention

The present invention relates to the transportation and storage of articles and, more particularly, to a system and a method for transporting and storing a variety of airplane seats.

2. Description of the Prior Art

Sometimes a seat must be removed from an airplane and transported to a selected location, such as a repair shop. This is typically done by installing the seat to be transported on a standard wooden pallet and carrying the latter with the seat thereon to the repair shop. During the handling of the pallet by the forklift, the feet of the seat can be damaged if they accidentally come in contact with the prongs of the forklift. Furthermore, once the seat has been transported to the repair shop, the seat must be removed from the pallet and mounted on an appropriate support structure to subsequently allow a technician to repair the seat. Additional damages can be made to the seat during its transfer from the pallet to the support structure.

Various seat carrying pallets have been develop as alternatives to conventional wooden pallets. For instance, U.S. Pat. No. 5,497,708 which issued on Mar. 12, 1996 to Jeruzal discloses a transportation pallet suited for mounting, transporting and handling an automobile seat. The pallet is provided with adjustable article attachment brackets. More particularly, the transportation pallet includes a primary pallet seated in a lower shell defining a pair of laterally spaced-apart openings for receiving the prongs of a forklift. Front and rear L-shaped elongated mounting brackets are secured to the topside of the primary pallet by means of bolts. A number of transversal brackets can be adjusted and fixed at various positions along the extent of the front and rear brackets.

Although the pallet disclosed in the above mentioned patent is effective to transport a variety of automobile seats or the like, it has been found that there is a need for a new seat transport and storage system wherein the seat does not need to be removed from the pallet for storing or repairing purposes.

SUMMARY OF THE INVENTION

It is therefore an aim of the present invention to provide a method for transporting and storing an airplane seat adapted to reduce the risks of damaging the seat while transporting the same to a destination.

It is also an aim of the present invention to provide a seat transport and storage system which is adapted to accommodate various types of airplane seats.

Therefore, in accordance with the present invention, there is provided a method for transporting and storing seats removed from an airplane, comprising the steps of a) providing a pan adapted to support a variety of airplane seats, b) securely mounting a seat unfastened from an airplane body on said pan, c) transporting said pan with said seat thereon to a selected location, and d) installing said pan on a complementary support structure provided at said selected location.

In accordance with a further general aspect of the present invention, there is provided a system for transporting and storing a variety of airplane seats, comprising a portable base pallet, first and second parallel seat supports for supporting a seat on said base pallet, wherein at least one of said first and second supports is slidably displaceable along a pair of parallel channels provided on said base pallet for selectively adjusting said first and second seat supports relative to one another, said pair of parallel channels slidably receiving opposed end portions of said first and second seat supports, and fasteners for rigidly fixing the seat on said first and second supports once the spacing therebetween has been adjusted in accordance with a foot spacing of the seat.

BRIEF DESCRIPTION OF THE DRAWINGS

Having thus generally described the nature of the invention, reference will now be made to the accompanying drawings, showing by way of illustration a preferred embodiment thereof, and in which:

FIG. 1 is a perspective exploded view of an adjustable pallet suited for transporting and storing a variety of airplane seats in accordance with a first embodiment of the present invention;

FIG. 2 is a perspective view of the adjustable pallet installed on a mobile cart which can be used to transport and support the airplane seat while the same is securely mounted on the pallet;

FIG. 3 is a perspective view of the adjustable pallet fitted in a secondary tray installed in a pallet rack for storage purposes; and FIG. 4 is an elevational cross-sectional view of the adjustable pallet taken along line 4—4 in FIG. 1.

DESCRIPTION OF THE PREFERRED EMBODIMENTS

Now referring to the drawings, and in particular to FIG. 1, an airplane seat transport and storage system embodying the elements of the present invention and generally designated by numeral 10 will be described.

The system 10 generally includes a transportable seat carrying pallet 12 which is configured to either fit in a storage tray 14 (FIG. 3) adapted to be installed in pallet racks R or on a mobile cart C (FIG. 2) having a pallet receiving structure 16 adapted to slidably receive the pallet 12 while an airplane seat S is securely mounted thereon, thereby eliminating handling of the seat S itself once the same has been fixed on the pallet 12. This significantly reduces the risks of the seat S be damaged while the same is being transported to a selected destination, such as a storage area or a repair shop.

As seen in FIG. 1, the seat carrying pallet 12 includes a pan 18 and a pair of parallel seat supports 20 and 22 mounted for sliding movement on the pan 18 in a longitudinal direction thereof between various fixed positions selected in accordance with the spacing between the right and left feet $F_r$ and $F_1$, of the airplane seat S to be securely mounted on the pan 18. The seat supports 20 and 22 extend in a direction perpendicular to the longitudinal axis of the pan 18 and are slidably received at opposed ends thereof in respective channels 24 and 26 formed on opposed longitudinal sides of the pan 18.

As best seen in FIG. 4, the pan 18 has a bottom wall 27 having a pair of opposed longitudinal side edges from which a pair of sidewalls 28 and 30 extend upwardly at right angles. Two shoulders 32 and 34 extend laterally outwardly from respective top ends of the sidewalls 28 and 30. A pair of rim-like members 36 and 38 extend upwardly at right angles from respective longitudinally extending outer edges of the shoulders 32. A pair of opposed lips 40 and 42 project laterally inwardly from respective top edges of the rim-like members 36 and 38 in a plane parallel to the plane of the shoulders 32 and 34 and the bottom wall 27. The lip 40, the rim-like member 36 and the shoulder 32 form the channel 24, whereas the lip 42, the rim-like member 38 and the shoulder 34 form the other channel 26. A pair of opposed end walls 44 and 46 extend at right angles from the bottom wall 27 between the side walls 28 and 30 to prevent the seat supports 20 and 22 from sliding out of the channels 24 and 26.

In accordance with the illustrated embodiment, the pan 18 is made from a single sheet of bendable material, such as metal, which has been bent so as to form the bottom wall 27, the sidewalls 28 and 30, the end walls 44 and 46, the shoulders 32 and 34, the rim like-members 36 and 38, and the lips 40 and 42 of the pan 18.

As seen in FIG. 1, a cutout portion 48 is defined in the lip 40 to allow the seat supports 20 and 22 to be inserted in the channels 24 and 26, i.e. between the lips 40 and 42 and the shoulders 32 and 34.

A series of longitudinally spaced-apart adjustment holes 50 are defined in the lips 40 and 42. Corresponding terminal holes 52 are defined at opposed ends of the seat supports 20 and 22. Accordingly, the seat supports 20 and 22 can be slidably displaced and fixed at any of a wide range of positions by placing respective terminal holes 52 thereof in registry with a selected pair of transversally aligned adjustment holes 50 of the lips 40 and 42 and then by inserting appropriate fasteners 54, such as bolts, therethrough. The seat supports 20 and 22 can thus be fixed at a distance from each other corresponding to the distance separating the left and right feet $F_r$ and $F_1$ of the seat S to be transported or stored.

A longitudinally-extending slot 56 is defined in a top surface of each of the seat supports 20 and 22. The number of circular enlarged seat portions 57 are distributed along each slot 56 for receiving two pairs of cylinders 58a and 58b depending respectively from the forward and aft ends of the feet $F_r$ and $F_1$. Each of the cylinders 58a and 58b has a slot 61 on each side thereof for allowing the seat S to be axially slid along the seat supports 20 and 22 after the cylinders 58a and 58b have been lowered into corresponding circular enlarged seat portions 57.

An intermediate actuable cylinder (not shown) is provided between each pair of cylinders 58a and 58b. Each intermediate actuable cylinder is axially displaceable between the corresponding pair of cylinders 58a and 58b between a retracted position in which the cylinders 58a and 58b can be inserted in the slot 56 with the intermediate cylinder lying over the top surface of the corresponding seat support 20 or 22, and an extended position in which the intermediate cylinder is lowered for engagement within one of the circular enlarged seat portions 57 after the cylinders 58a and 58b have been slid between two adjacent circular enlarged seat portions 57.

Each intermediate cylinder is actuable by means of a set screw (not shown) or the like.

When it is desired to secure the seat S on the seat supports 20 and 22, one has first to align the cylinders 58a and 58b with some of the underlying circular enlarged seat portions 57, lower the seat S onto the seat supports 20 and 22 so as to insert the cylinders 58a and 58b into the slots 56, slide the seat S in the slots 56 to align the intermediate cylinders with corresponding circular enlarged seat portions 57, and actuate the set screws to press the intermediate actuable cylinders against the bottom of the slots 56, thereby preventing further sliding motion of the seat S relative to the seat supports 20 and 22. The cylinders 58a and 58b, which are out of phase relative to the enlarged seat supports 57, prevent the chair from being lifted out of the seat supports 20 and 22.

The plurality of enlarged seat portions 57 on the seat supports 20 and 22 allows airplane seats having different foot lengths to be secured thereto.

The pallet 12 can be transported, for instance, by a forklift (not shown) with the prongs thereof extending laterally outwardly of the side walls 28 and 30 of the pan 18 and the undersurface of the shoulders 32 and 34 resting on the prongs of the forklift.

When it is desired to remove a seat from an airplane and transport it to a selected location, such as a repair shop or a storage area, the pallet 12 is carried into the airplane to receive the unfastened seat S. On site, the relative position of the seat supports 20 and 22 is adjusted in accordance with the spacing between the left and right feet $F_r$ and $F_1$. of the seat S. Then, the seat S is lowered onto the pan 18 so that the feet $F_r$ and $F_1$ thereof rest against the top surface of the seat supports 20 and 22. Thereafter, the seat S is secured to the seat supports 20 and 22. Once the seat S has been secured on the pallet 12, the same is carried out of the airplane and then transported to the selected destination.

If the seat S has to be repaired, the pallet 12 with the seat S thereon can be slidably inserted between a pair of open ended C-shaped guides 60 forming part of the pallet receiving structure 16 illustrated in FIG. 2. The guides 60 are secured on a plate 62 pivotally mounted, such as at 64, to the mobile cart C. A stopper (not shown) is provided to maintain the plate 62 at various angles relative to the frame of the mobile cart C. Accordingly, various reparations can be made to the seat S without having to remove the seat S from the pallet 12. This contributes to reduce the risks that the seat S be inadvertently damaged.

Once the seat S has been repaired, the pallet 12 can be readily slid out of the guides 60 and transported into the storage tray 14 illustrated in FIG. 3. The storage tray 14 is provided on each side thereof with a pair of downwardly depending transversal members 68 adapted to receive therebetween one horizontal side member 70 of the pallet rack R in order to prevent the tray 14 from falling off the pallet rack R. The storage tray 14 has a bottom wall 72, a pair of longitudinal sidewalls 74 projecting upwardly at right angles from the bottom wall 72, and one end wall 76 extending upwardly at right angle from the bottom wall 72 between the sidewalls 74. The opposite end of the tray 14 is open to allow the pallet 12 to be slid therein while the storage tray 14 is installed in the pallet rack R. The complementarity of the storage tray 14 and the pallet 12 further contributes to reduce the risks that the seat S be damaged while being handled to be stored.

What is claimed is:

1. A system for transporting and storing a variety of airplane seats, comprising a portable base pallet, first and second parallel seat supports for securely mounting a seat on said base pallet, wherein at least one of said first and second supports is slidably displaceable along a pair of parallel channel provided on said base pallet for selectively adjusting said first and second seat supports relative to one another, said pair of parallel channels slidably receiving opposed end portions of said first and second seat supports, wherein said base pallet is formed from a sheet of bendable material having opposed longitudinal side portions folded so as to define said parallel channels, wherein said base pallet has a bottom wall, opposed sidewalls extending upwardly from opposed longitudinal edges of said bottom wall, a pair of shoulders extending laterally outwardly from respective top ends of said opposed sidewalls, a rim extending upwardly from an outer end of each of said shoulders, and a lip projecting inwardly from each of said rims, wherein said lips, sad rims, and said shoulders cooperate to form said parallel channels.

2. A system as defined in claim 1, wherein said channels are integral to said base pallet.

3. A system as defined in claim 1, wherein longitudinally spaced-apart holes are defined along said lips for receiving fasteners to secure said first and second seat supports at various locations on said base pallet.

4. A system as defined in claim 1, wherein said base pallet further includes a pair of opposed end walls extending upwardly from said bottom wall to prevent any one of said first and second seat supports from sliding out of said parallel channels.

5. A system as defined in claim 4, wherein a cutout portion is defined in at least one of said lips to allow said first and second seat supports to be inserted into said channels.

6. A system as defined in claim 1, wherein said shoulders have respective undersurfaces, said undersurfaces being arranged relative to one another so as to form with said sidewalls a pair of longitudinally extending guides to receive a pair of prongs of a forklift so that said base pallet can be transported from one place to another.

7. A system as defined in claim 1, further including a pallet receiving structure adapted to receive said base pallet in a complementary fashion, while the seat is mounted thereon.

8. A system as defined in claim 7, wherein said pallet receiving structure is adapted to support said base pallet in various angular positions.

9. A system as defined in claim 8, wherein said pallet receiving structure includes a mobile cart and a plate pivotally mounted thereto, a pair of spaced-apart parallel channels being provided on a top surface of said plate for receiving said base pallet therebetween.

10. A system as defined in claim 7, wherein said pallet receiving structure includes a storage tray adapted to be installed in a pallet rack.

* * * * *